United States Patent
Kwon

(10) Patent No.: US 7,208,973 B2
(45) Date of Patent: Apr. 24, 2007

(54) ON DIE TERMINATION CIRCUIT

(75) Inventor: Dae Han Kwon, Seoul (KR)

(73) Assignee: Hynix Semiconductor Inc., Kyungki-do (KR)

( * ) Notice: Subject to any disclaimer, the term of this patent is extended or adjusted under 35 U.S.C. 154(b) by 76 days.

(21) Appl. No.: 11/008,043

(22) Filed: Dec. 9, 2004

(65) Prior Publication Data

US 2005/0225353 A1 Oct. 13, 2005

(30) Foreign Application Priority Data

Apr. 8, 2004 (KR) .................. 10-2004-0024184

(51) Int. Cl.
*H03K 17/16* (2006.01)
*H03K 5/12* (2006.01)
*H03K 19/094* (2006.01)

(52) U.S. Cl. ........................... 326/30; 326/113
(58) Field of Classification Search .............. 326/30, 326/83, 87, 113; 327/108, 109, 170
See application file for complete search history.

(56) References Cited

U.S. PATENT DOCUMENTS 6,470,054 B1 10/2002 Boudry et al. ............. 375/257
6,642,740 B2 * 11/2003 Kim et al. .................. 326/30
2004/0141391 A1 * 7/2004 Lee et al. ................... 365/200

FOREIGN PATENT DOCUMENTS

KR 2003-6525 1/2003

OTHER PUBLICATIONS

Official Action for Korean Patent Application No. 2004-24184 dated Nov. 22, 2006.
Offical Action for Taiwanese Patent Application No. 93138857 dated Dec. 19, 2006 (English translation only).

* cited by examiner

*Primary Examiner*—Daniel D. Chang
(74) *Attorney, Agent, or Firm*—Marshall, Gerstein & Borun LLP

(57) ABSTRACT

The present invention discloses an on die termination circuit. The on die termination circuit used in a DDR2 employs transmission gates as pull-up and pull-down switches, equalizes pull-up and pull-down resistance values by changing connection relations between switches and resistors, and maintains a constant voltage of an input pin.

6 Claims, 3 Drawing Sheets

ON DIE TERMINATION CIRCUIT

BACKGROUND

1. Field of the Invention

The present invention relates to an on die termination circuit, and more particularly to, a switch circuit for turning on or off resistors of an on die termination circuit.

2. Discussion of Related Art

Recently, a memory chip tendency is summarized as high integration and a high data processing speed. A DDR2 popularized in a main memory market is one example showing the tendency. That is, the memory has a capacity over 512 Mb and a data processing speed over 400 Mb per second.

In order to obtain a high data processing speed, the DDR2 newly uses an off chip driver scheme and an on die termination scheme. In the general on die termination scheme, source termination is performed at a transmission side by an output circuit, and parallel termination is performed at a reception side by a termination circuit connected in parallel to a receiving circuit connected to an input pad.

FIG. 1 is a circuit diagram illustrating a conventional on die termination circuit.

Referring to FIG. 1, the conventional on die termination circuit includes an input transmission line L1 for transmitting a data of an external input pin 10 to an input buffer 20, a first PMOS transistor P1 and a first resistor R1 and a second PMOS transistor P2 and a second resistor R2 connected in series between a first voltage source VDDQ and the input transmission line L1, respectively, and a first NMOS transistor N1 and a third resistor R3 and a second NMOS transistor N2 and a fourth resistor R4 connected in series between a second voltage source VSSQ and the input transmission line L1, respectively. The first PMOS transistor P1 is driven according to an inversed first termination signal/odt_sw1, and the second PMOS transistor P2 is driven according to an inverted second termination signal /odt_sw2. The first NMOS transistor N1 is driven according to a first termination signal odt_sw1, and the second NMOS transistor N2 is driven according to a second termination signal odt_sw2.

Preferably, the first and second resistors R1 and R3 use the same resistance value, and the second and fourth resistors R2 and R4 use the same resistance value. The resistance values of the first to fourth resistors R1 to R4 are very important in signal integrity. However, in a general process for manufacturing elements, processes of the NMOS transistors and the PMOS transistors are different from each other, and thus different turn-on resistances are generated. Accordingly, a pull-up resistance and a pull-down resistance are different from each other. That is, when it is presumed that a turn-on resistance of a pull-up PMOS transistor is Rp and a turn-on resistance of a pull-down NMOS transistor is Rn, a total termination resistance Rtt is $\{(R1+Rp)(R1+Rn)\}/(2R1+Rp+Rn)$ or $\{(R2+Rp)(R2+Rn)\}/(2R2+Rp+Rn)$. As a result, a termination voltage of the input pin does not have a value of Vdd/2, which has detrimental effects on signal integrity.

SUMMARY OF THE INVENTION

The present invention is directed to an on die termination circuit which can equalize pull-up and pull-down resistance values by changing pull-up and pull-down PMOS transistors and NMOS transistors into transmission gates, and which can maintain a constant voltage of an input pin.

One aspect of the present invention is to provide an on die termination circuit, including: an input transmission line for transmitting a data of an external input pin to an input buffer; a first resistor and a first transmission gate driven according to a first termination signal, which are connected in series between a first voltage source and the input transmission line; a second resistor and a second transmission gate driven according to the first termination signal, which are connected in series between a second voltage source and the input transmission line; a third resistor and a third transmission gate driven according to a second termination signal, which are connected in series between the first voltage source and the input transmission line; and a fourth resistor and a fourth transmission gate driven according to the second termination signal, which are connected in series between the second voltage source and the input transmission line.

Preferably, the first to fourth transmission gates are transmission gates in which NMOS and PMOS transistors are connected in parallel and efficiently operated within a voltage range of −Vtp to VDD-Vtn.

Preferably, the first and second resistors use the same resistance value, the third and fourth resistors use the same resistance value, the first voltage source is VDDQ, and the second voltage source is VSSQ.

DETAILED DESCRIPTION OF PREFERRED EMBODIMENTS

Figure 1:
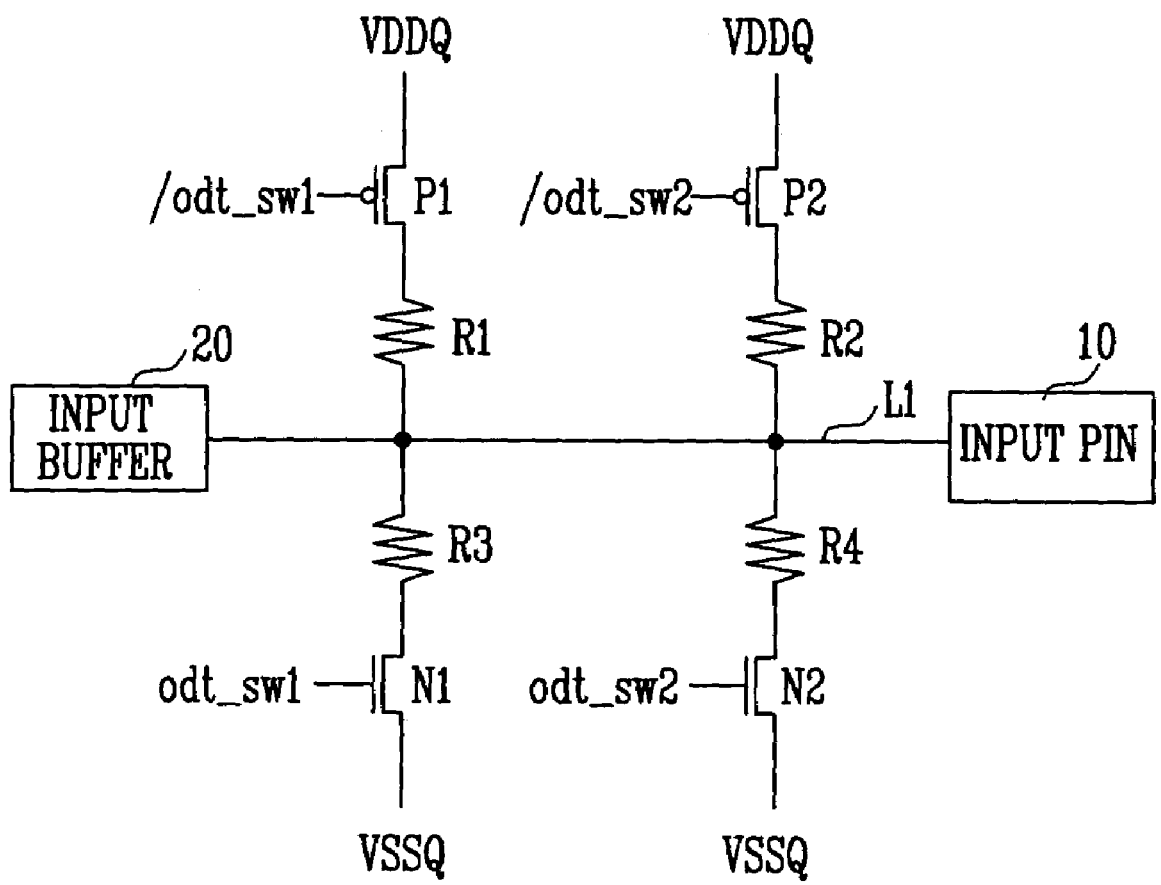
FIG. 1 is a circuit diagram illustrating a conventional on die termination circuit.

An on die termination circuit in accordance with a preferred embodiment of the present invention will now be described in detail with reference to the accompanying drawings. The embodiment of the present invention can be modified in various forms, which is not intended to be limiting. The embodiment of the present invention is provided to fully explain the present invention to the ordinary people in the art to which the present invention pertains. Wherever possible, the same reference numerals will be used throughout the drawings and the description to refer to the same or like parts.

Figure 2:
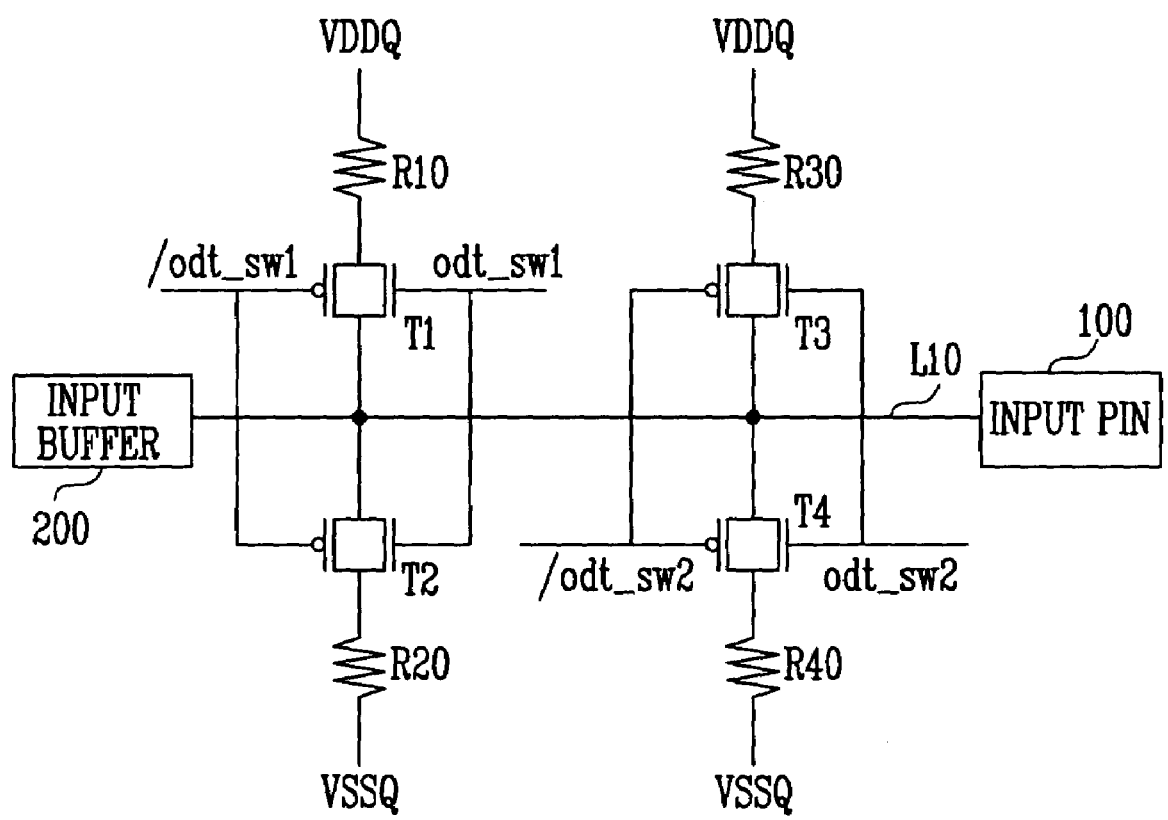
FIG. 2 is a circuit diagram illustrating an on die termination circuit in accordance with the present invention.

FIG. 2 is a circuit diagram illustrating the on die termination circuit in accordance with the present invention.

As illustrated in FIG. 2, the on die termination circuit includes an input transmission line L10 for transmitting a data of an external input pin 100 to an input buffer 200, a first resistor R10 and a first transmission gate T1 driven according to a first termination signal odt_sw1, which are connected in series between a first voltage source VDDQ and the input transmission line L10, a second resistor R20 and a second transmission gate T2 driven according to the first termination signal odt_sw1, which are connected in series between a second voltage source VSSQ and the input transmission line L10, a third resistor R3 and a third transmission gate T3 driven according to a second termination signal odt_sw2, which are connected in series between the first voltage source VDDQ and the input transmission line L10, and a fourth resistor R40 and a fourth transmission gate T4 driven according to the second termination signal odt_sw2, which are connected in series between the second voltage source VSSQ and the input transmission line L10.

Preferably, the first and second resistors R10 and R20 use the same resistance value, and the third and fourth resistors R30 and R40 use the same resistance value. Preferably, the first termination signal odt_sw1 is applied to gate terminals of NMOS transistors of the first and second transmission gates T1 and T2, and an inverted first termination signal/odt_sw1 is applied to PMOS transistors thereof. Preferably, the second termination signal odt_sw2 is applied to gate terminals of NMOS transistors of the third and fourth transmission gates T3 and T4, and an inverted second termination signal/odt_sw2 is applied to PMOS transistors thereof. Preferably, the first voltage source is VDDQ, and the second voltage source is VSSQ.

Preferably, the first to fourth transmission gates T1 to T4 are transmission gates in which NMOS and PMOS transistors are connected in parallel, and positioned between the resistors and the transmission line, respectively. According to the operational characteristics of the transmission gate, when the transmission gate transmits a voltage of VDD or VSS, one of the NMOS and PMOS transistors of a pass gate always exists in a cutoff region. Here, a turn-on resistance of the pass gate is identical to a turn-on resistance of one of the two transistors. In the case that the transmission gate transmits an intermediate voltage between VDD and VSS, both the NMOS and PMOS transistors are turned on. Here, the turn-on voltage of the pass gate is a parallel resistance value of the turn-on resistances of the two transistors. Therefore, in accordance with the present invention, positions of the transmission gates serving as resistors and switches are preferably switched, so that the voltages transmitted by the first to fourth transmission gates T1 to T4 cannot be VDD or VSS. Accordingly, the voltage transmitted by the two transistors becomes an intermediate voltage between VDD and VSS, and the turn-on resistance of the transmission gate becomes a parallel resistance value of the turn-on resistances of the NMOS and PMOS transistors, which has a constant value within a voltage range of $-V_{tp}$ to $VDD-V_{tn}$. Here, $V_{tp}$ denotes a threshold voltage of the PMOS transistor and $V_{tn}$ denotes a threshold voltage of the NMOS transistor. The pull-up and pull-down resistances can be provided with the same value, and the voltage of the input pin can maintain exactly VDD/2, to improve signal integrity.

The operation of the on die termination circuit in accordance with the present invention will now be described.

When one of two modules is operated and the other is not operated, a predetermined termination signal is applied to an on die termination circuit of the non-operated module, for generating a target termination resistance. Signals of the operated module are efficiently generated by using the target termination resistance.

Figure 3:
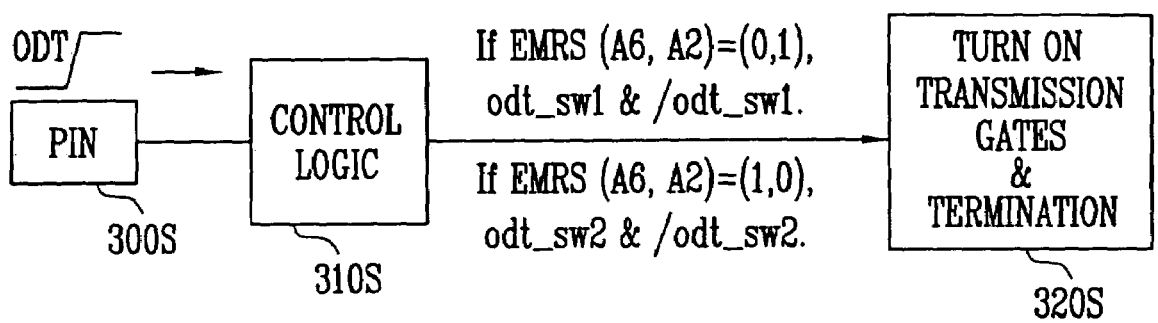
FIG. 3 is a concept diagram illustrating an operation of the on die termination circuit in accordance with the present invention.

FIG. 3 is a concept diagram illustrating the operation of the on die termination circuit in accordance with the present invention.

As shown in FIGS. 2 and 3, when an ODT enable signal ODT is applied to an ODT pin 300S disposed outside a DRAM chip, the ODT enable signal ODT is transmitted to an ODT control logic 310S disposed inside the DRAM chip. The ODT control logic 310S generates the first or second termination signal odt_sw1, /odt_sw1, odt_sw2 and /odt_sw2 according to a target resistance set in an Extended Mode Register Set (EMRS).

When the first and second termination signals odt_sw1 and odt_sw2 are applied, the first and second transmission gates T1 and T2 or the third and fourth transmission gates T3 and T4 are driven according to logic states of the first and second termination signals odt_sw1 and odt_sw2, for terminating the input pin according to a predetermined termination resistance value 320S. Here, DQ, DQS, /DQS and DM pins can be all terminated.

In more detail, if A6 and A2 of the EMRS have values of 0 and 1 respectively, the target termination resistance ranges from 70 to 80Ω, and the first termination signal odt_sw1 and the inverted first termination signal/odt_sw1 are generated. If A6 and A2 of the EMRS have values of 1 and 0 respectively, the target termination resistance ranges from 140 to 160Ω, and the second termination signal odt_sw2 and the inverted second termination signal/odt_sw2 are generated. Here, the first and second transmission gates T1 and T2 or the third and fourth transmission gates T3 and T4 are turned, for terminating the input pin.

As discussed earlier, in accordance with the present invention, the on die termination circuit used in the DDR2 employs the transmission gates as the pull-up and pull-down switches, equalizes the pull-up and pull-down resistance values by changing connection relations between the switches and resistors, and maintains the constant voltage of the input pin.

Although the present invention has been described in connection with the embodiment of the present invention illustrated in the accompanying drawings, it is not limited thereto. It will be apparent to those skilled in the art that various substitutions, modifications and changes may be made thereto without departing from the scope and spirit of the invention.

What is claimed is:

1. An on die termination circuit, comprising:
   an input transmission line for transmitting a data of an external input pin to an input buffer;
   a first resistor connected to a first voltage source;
   a first transmission gate connected between the first resistor and the input transmission line and driven according to a first termination signal and an inverted first termination signal;
   a second resistor connected to a second voltage source;
   a second transmission gate connected between the second resistor and the input transmission line and driven according to the first termination signal and the inverted first termination signal;
   a third resistor connected to the first voltage source;
   a third transmission gate connected between the third resistor and the input transmission line and driven according to a second termination signal and an inverted second termination signal;
   a fourth resistor connected to the second voltage source; and
   a fourth transmission gate connected between the fourth resistor and the input transmission line and driven according to the second termination signal and the inverted second termination signal.

2. The circuit of claim 1, wherein the first to fourth transmission gates are transmission gates in which NMOS and PMOS transistors are connected in parallel and operated within a voltage range of $-V_{tp}$ to $VDD-V_{tn}$.

3. The circuit of claim 1, wherein the first and second resistors use the same resistance value, the third and fourth resistors use the same resistance value, the first voltage source is VDD, and the second voltage source is VSS.

4. An on die termination circuit, comprising:
   an input transmission line for transmitting a data of an external input pin to an input buffer;

a first resistor connected to a first voltage source;
a first transmission gate connected between the first resistor and the input transmission line and driven according to a first termination signal;
a second transmission gate connected between the second resistor and the input transmission line and driven according to the first termination signal wherein a turn-on resistance of the first transmission gate is equal to that of the second transmission gate;
a second resistor connected to a second voltage source;
a third resistor connected to the first voltage source;
a third transmission gate connected between the third resistor and the input transmission line and driven according to a second termination signal;
a fourth resistor connected to the second voltage source; and
a fourth transmission gate connected between the fourth resistor and the input transmission line and driven according to the second termination signal, wherein a turn-on resistance of the third transmission gate is equal to that of the fourth transmission gate.

5. The circuit of claim 4, wherein the first to fourth transmission gates are transmission gates in which NMOS and PMOS transistors are connected in parallel and operated within a voltage range of $-V_{tp}$ to $VDD-V_{tn}$.

6. The circuit of claim 4, wherein the first and second resistors use the same resistance value, the third and fourth resistors use the same resistance value, the first voltage source is VDD, and the second voltage source is VSS.

* * * * *